United States Patent [19]

McCauley et al.

[11] 4,241,000
[45] Dec. 23, 1980

[54] PROCESS FOR PRODUCING POLYCRYSTALLINE CUBIC ALUMINUM OXYNITRIDE

[75] Inventors: James W. McCauley, Wakefield; Normand D. Corbin, Lynn, both of Mass.

[73] Assignee: The United States of America as represented by the Secretary of the Army, Wasington, D.C.

[21] Appl. No.: 936,447

[22] Filed: Aug. 24, 1978

[51] Int. Cl.$^3$ .................... C01B 21/00; C01F 7/00
[52] U.S. Cl. ................................ 264/65; 264/66; 423/266; 423/385; 423/631
[58] Field of Search ............ 423/266, 385, 625, 412; 106/73.4; 264/65, 66

[56] References Cited

U.S. PATENT DOCUMENTS

| | | | |
|---|---|---|---|
| 3,108,887 | 10/1963 | Lenie et al. | 423/412 |
| 3,572,992 | 3/1971 | Komeya et al. | 423/412 |
| 4,147,759 | 4/1979 | Demit | 106/73.4 |

OTHER PUBLICATIONS

Lejus, "Rev. Hautes Temper. et Refract.", vol. 1, 1965, pp. 53-95 (pp. 85-94 of interest).
Sakai, "Chemical Absts.", vol. 88, 1978, p. 307.
Goursat et al., "Chemical Absts.", vol. 86, 1977, p. 203.
Long et al., "Journal of American Ceramic Soc.", vol. 44, pp. 255-258, 1961.
Irene et al., "Journal of Electronic Materials", vol. 4, 1975, pp. 409-427.

*Primary Examiner*—Herbert T. Carter
*Attorney, Agent, or Firm*—Nathan Edelberg; Robert P. Gibson; Lawrence E. Labadini

[57] ABSTRACT

A structural ceramic material comprising single phase polycrystalline cubic aluminum oxynitride preferably with at least 97% of theoretical density which displays transparency and isotropic optical, thermal and electrical properties, an infrared cutoff at about 5.2 microns wavelength, and which shows no chemical or physical property change after heating in air (atmosphere) at 1100° C.

3 Claims, 4 Drawing Figures

PROCESS FOR PRODUCING POLYCRYSTALLINE CUBIC ALUMINUM OXYNITRIDE

BACKGROUND OF THE INVENTION

The invention described herein may be manufactured, used, licensed by or for the U.S. Government for governmental purposes without payment to us of any royalty thereon.

The present invention relates to aluminum oxide structural (self-supporting and having load carrying capability) material.

Polycrystalline $\alpha$-aluminum oxide is one of the most commonly used advanced structural ceramic materials. In its various forms (e.g., $Al_2O_3$/glass; $Al_2O_3$/other silica phases; pure $Al_2O_3$; etc.) it is used for ballistic armor, bearings, tool bits, furnace parts, abrasive grain, electrical insulating components, etc. A recent application has been as a light transmitting envelope in sodium vapor lamps.

Aluminum oxide, however, is an anisotropic material—meaning that its various directional properties are different in different directions in the single crystal. This results, for example, in optical birefringence and anistropic thermal expansion and contraction. Thus in polycrystalline bodies of $\alpha$-$Al_2O_3$, various adjacent grains may be completely mis-oriented with respect to their various directional properties causing significant strain at the grain boundaries; also, only optical translucency is possible instead of the glass-like transparency of isotropic materials, because of its inherent birefringence.

It is an important object of the present invention to provide the first realization of sintered polycrystalline nitrogen stabilized cubic aluminum oxide material, usable as a structural material in at least some of the foregoing applications of known aluminum oxide structural ceramic materials.

It is a further object of the invention to provide isotropic properties of such a material in at least one or more, preferably all, of optical, thermal and electrical testing consistent with the preceding object.

It is a further object of the invention to provide a structural ceramic material with optical transparency consistent with one or more of the preceding objects.

It is a further object of the invention to provide such temperature stability that salient chemical and physical properties (including chemical composition) of such new ceramic materials will not change after heating in air at 1100° C. for 24 hours, consistent with one or more of the preceding objects.

SUMMARY OF THE INVENTION

For several years, we were working on the quaternary ceramic system, $Si_3N_4$—$SiO_2$—$Al_2O_3$—$AlN$. One of many potential industrial/military end use applications for such studies was the possibility of realizing high temperature transparent bodies usable in vehicle (ground and airborne) armor, radar and infrared domes, high intensity discharge lamp envelopes and sodium vapor lamp envelopes. After recognizing the importance of understanding phase equlibirium in the binary aluminum oxidealuminum nitride join in that quaternary system, work concentrated on that specific join. In the course of it, a method for the preparation of a new sintered, polycrystalline transparent (and therefore isotropic) nitrogen stabilized cubic aluminum oxide material was discovered. The material comprised:

A structural ceramic material comprising sintered single (spinel) phase, polycrystalline, cubic aluminum oxynitride with 70-100% theoretical density which displays isotropic optical thermal and electrical properties, an infrared cutoff at about 5.2 microns wavelength, and which shows no chemical or physical property change after heating in air (atmosphere) at 1100° C.

It is usable at least in the above described applications of aluminum oxide structural ceramics. This new material is a nitrogen stabilized cubic aluminum oxide. The existence of the spinel phase, per se, has been suggested in the literature, as follows:

(a) G. Long & L. M. Foster, "Crystal Phases in the System $Al_2O_3$-$AlN$," J. Amer. Cer. Soc. 44 [6] 255-58 (1961).

(b) A. Lejus, "Formation at High Temperature of Non-stoichiometric Spinels and of Derived Phases in Several Oxide Systems Based on Aluminum and in the System Alumina-Aluminum Nitride," Rev. Int. Hautes Temp. Refract. 1 [1] 53-95 (1965).

(c) A. Irene, V. J. Silvestri and G. R. Woolhouse, "Some Properties of $Al_xO_yN_z$ on Silicon" J. Electron. Mat., 4, 409–427 (1975) However, none of these references involve establishment of the temperature-composition limits of stability of nitrogen stabilized, cubic aluminum oxide or the production of sintered, substantially fully or fully dense bodies thereof, including transparent bodies, as has been done by us.

The process used to make this new material comprises the basic staps of (a) preparing a fine grained homogeneous mixture of precursor solids, (b) pre-reaction heat treatment thereof in an oxidation free environment, (c) final reaction and sintering densification (reaction sintering) thereof to at least 97% of theoretical without liquid formation to eliminate all precursor components per se and form cubic aluminum oxynitride spinel.

Other objects, features and advantages of the invention will be apparent from the following detailed description of preferred embodiments thereof, taken in connection with the accompanying drawing, in which,

DETAILED DESCRIPTION OF PREFERRED EMBODIMENTS

A phase equilibrium diagram (including the inclusion of liquid and gaseous stability regions and an interpretation of metastable phase portions) was constructed for the pseudo binary of $Al_2O_3$—$AlN$.

Figure 1:
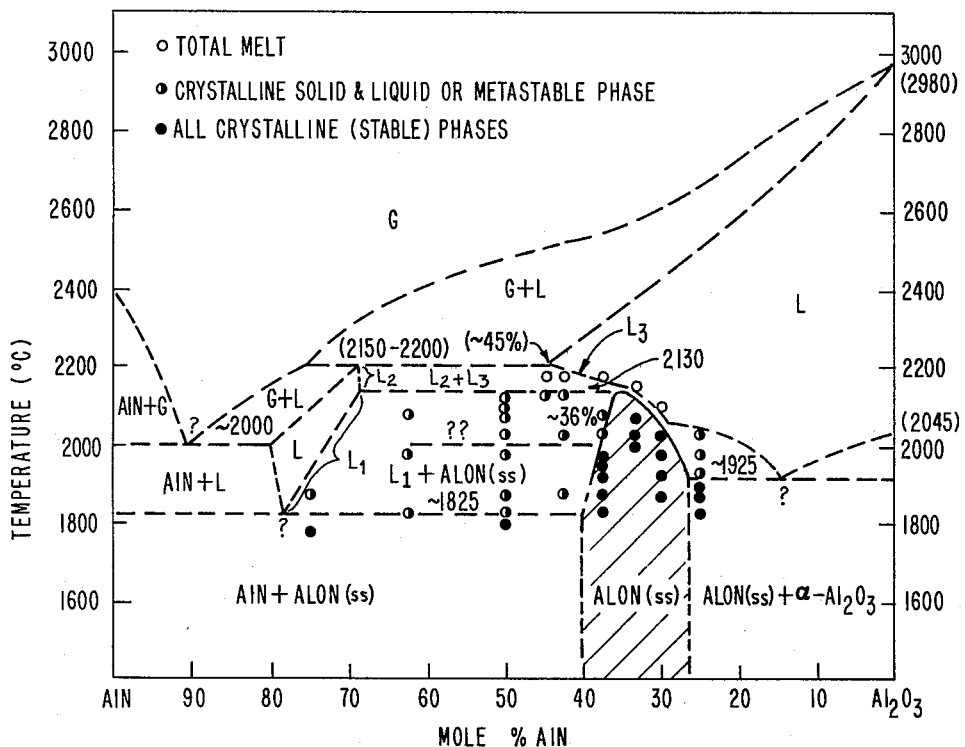
FIG. 1 is our postulated phase equilibrium diagram (with a modified format of diagrams of this type) for the $Al_2O_3$-$AlN$ system.

The shaded area of FIG. 1 indicates the region of single phase stable solid solution of aluminum oxynitride from 30 (±1) to 40 (±1) mole percent AlN up to a maximum temperature stability level of about 2100°±10° C. The dashed lines of phase separation in the diagram indicate uncertainty and approximation.

Figure 2:
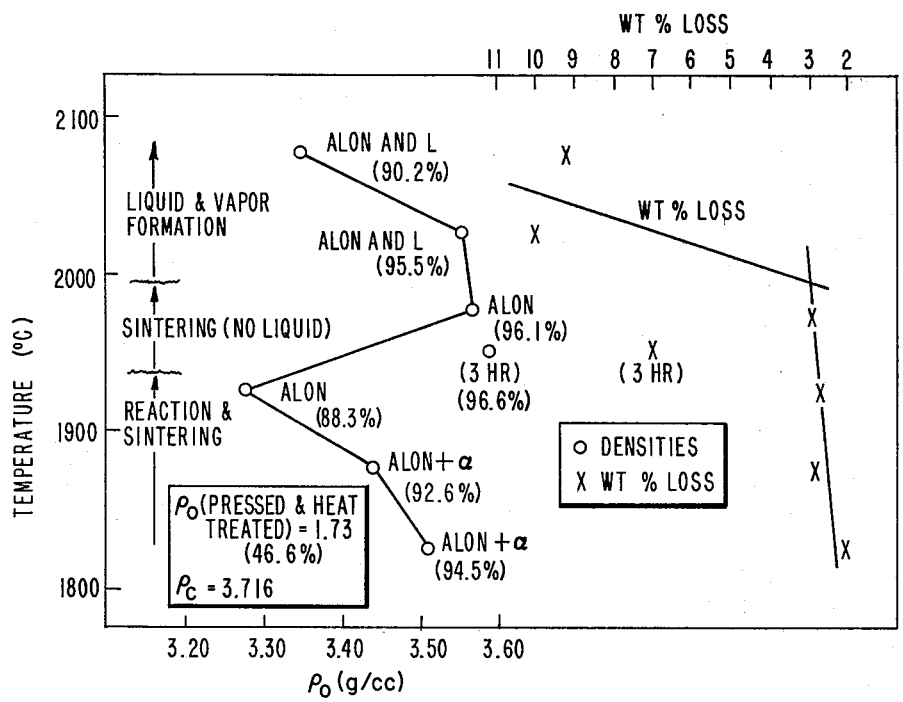
FIG. 2 is a combined density-weight loss chart for a selected mixture composition of $Al_2O_3$—$AlN$.

FIG. 2 is temperature density/wt. loss diagram showing results of a series of runs of 37.5 mole %AlN of the $Al_2O_3$—AlN mixtures.

Samples were made from mixed fine-grained powders of precursor components of $Al_2O_3$ and AlN in selected molar proportions, were compacted and pre-heat-treated to a density of 1.73 gm/cc and then further heated to the temperatures indicated and quickly quenched. Then, weight and volume measurements were made and density and weight loss percentages were calculated for each run (i.e., each circle or cross [x] representing a run). It is evident from the results shown in FIGS. 1-2 that reaction and sintering take place up to about 1975°—first, reaction to form cubic aluminum oxynitride spinel and eliminate all precursor components (i.e., $\alpha$-$Al_2O_3$ and AlN, per se) and then sintering/densification takes place. For this composition (i.e., 37.5 mole percent AlN), at about 2000° C. the solid solution $Al_2O_3$—AlN becomes unstable and a liquid grain boundary phase forms, resulting in significant weight loss because of volatility of the liquid phase, unless precautions are taken to avoid or limit such liquid formation.

Fabrication procedures for useful structural purposes (e.g., in the above mentioned applications) and experimental purposes, we have utilized (and prefer) to make the new material described herein comprise:

1. Analytical weighing of components—in the above experiments $Al_2O_3$ (99.9% purity with an average particle size (APS) of 1.1 um) and AlN (99% purity, 14 um APS) were used. APS refers to average diameter of equivalent spheres, as in Fisher average particle diameter measurement, sedimentation, and the like.
2. Ball milling in ethanol for 24 hours to assure a homogeneous mixture.
3. Isostatic pressing of dried, blended mixtures at 25,000 psi or higher.
4. Pre-reaction heat treatment at 1200° C. for 24 hours in gas tight flowing $N_2$ system—in this step it is extremely important to eliminate any oxidation gasses from the atmosphere.
5. Final reaction and sintering in a graphite induction furnace for about one hour for sintering densification with the sample contained in boron nitride crucible assembly. Before heating, the closed system is evacuated with a mechanical pump and then about ½ liter per minute of $N_2$ gas at one atmosphere pressure is allowed to flow past the sample from beginning of the heat until the total cooldown. Formation of a liquid phase at grain boundaries is substantially entirely avoided.

Figure 3:
FIG. 3 is a microphotograph of structure of single phase cubic aluminum oxynitride spinel made from a selected composition within the scope of the invention.

FIG. 3 is a photomicrograph of 70 mole percent $Al_2O_3$—AlN material made under the procedure described above. The photomicrograph was made under reflective light which was slightly defocused to bring out microstructure showing the single phase (no grain boundary or secondary phases) structure of the material.

Figure 4:
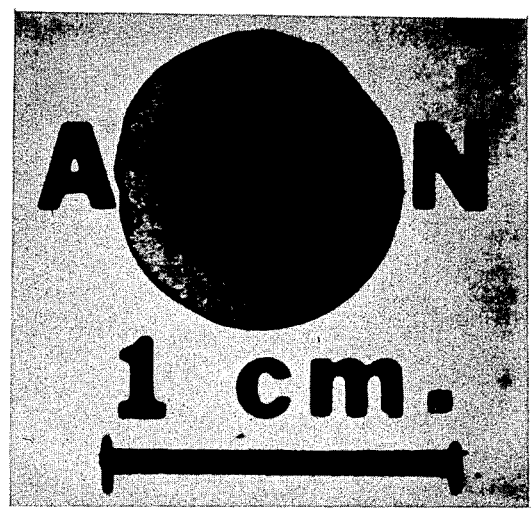
FIG. 4 is a photograph of a disk of the same material as is shown in FIG. 3 arranged to illustrate optical properties thereof.

FIG. 4 is a photograph of a 0.035 inch thick disk of the same material placed over a lettered sheet (letters: ALON) with slight magnification as indicated by the "1 cm" fiduciary marking to display the transparency of the sample. The disk was polished on both sides. It was determined by density analysis to have a density of 3.6 gm/cc, i.e., 97.2% of theortical.

The FIG. 3/4 sample had a Knoop (100) hardness of 1734 Kg/mm$^2$ and an infrared cutoff of 5.2 microns wavelength. The material was heated in air at 1100° C. and showed no weight change or visible effect, indicating no change in chemical or physical properties. It is to be expected that the transparency will be even better at higher densities, although even at the 97.2% density achieved the transparency or translucency thereof is better than any achieved for any prior art, coherent sintered or cast (and polished) aluminum oxynitride shapes.

The precursor components used to make sintered aluminum oxynitride are preferably separate aluminum oxide and aluminum nitride. But other single or multiple precursors can be used (e.g., two aluminum oxynitride powders of respective compositions higher and lower than the desired end product composition) and the single or multiple precursor components can be solid or solid/solid or gas/solid mixtures (or gas/gas mixtures producing solids by chemical vapro depostion). A premelt of precursor single or multiple components can be made, quenched and pulverized to produce the precursor fine grain powder components.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the product and process herein disclosed and limited solely by the scope and spirit of the appended claims.

What is claimed is:

1. A method of making sintered, single phase, polycrystalline cubic aluminum oxynitride with 70–100% of theoretical density which displays isotropic optical, thermal and electrical properties, and shows essentially no chemical or physical property change after heating in air at 1100° C. which comprises in sequence the steps of
   (a) compacting a mixture of fine grained powders of $Al_2O_3$ and 30 (±1) to 40 (±1) mole percent of AlN, by isostatic pressing of the mixture at a pressure of at least 25,000 psi,
   (b) heat treating at a temperature of 1200° C. for 24 hours said compacted mixture in an oxidation free environment to a density of about 1.73 gm/cc, and
   c. heating the mixture at a temperature above 1800° C. to effect reaction and sintering densification but below the temperature at which a liquid grain boundry phase forms.

2. A method according to claim 1 wherein the final heat treatment occurs in one atmosphere of flowing nitrogen.

3. A method according to claim 2 wherein said AlN is present as 37.5 mole percent of the mixture and wherein said final heat treatment occurs at a temperature of about 1975° C. to produce a product having a density of 3.6 gm/cc.

* * * * *